AUTOMATIC TELEPHONE ANSWERING AND MESSAGE RECORDING SYSTEM

Filed Dec. 16, 1960

5 Sheets-Sheet 1

SEP 30 1965

INVENTORS
CHARLES M. MARTIN
ROBERT O. MYERS
KENNETH LE GROS
EMIL E. EVANS
EDWARD A. MARHEINE

BY C. A. Gullbrandsen
ATTY.

Dec. 28, 1965 C. M. MARTIN ETAL 3,226,478

AUTOMATIC TELEPHONE ANSWERING AND MESSAGE RECORDING SYSTEM

Filed Dec. 16, 1960

5 Sheets-Sheet 2

INVENTORS
CHARLES M. MARTIN
ROBERT O MYERS
KENNETH LE GROS
EMIL E. EVANS
EDWARD A. MARHEINE

BY

C. A. Gulbrandsen
ATTY.

AUTOMATIC TELEPHONE ANSWERING AND MESSAGE RECORDING SYSTEM

Filed Dec. 16, 1960

INVENTORS
CHARLES M. MARTIN
ROBERT O. MYERS
KENNETH LE GROS
EMIL E. EVANS
EDWARD A. MARHEINE
BY
C. A. Gulbrandsen
ATTY.

AUTOMATIC TELEPHONE ANSWERING AND MESSAGE RECORDING SYSTEM

Filed Dec. 16, 1960

5 Sheets-Sheet 4

INVENTORS
CHARLES M. MARTIN
ROBERT O. MYERS
KENNETH LE GROS
EMIL E. EVANS
EDWARD A. MARHEINE
BY C. A. Gullbrandsen
ATTY.

Dec. 28, 1965 C. M. MARTIN ETAL 3,226,478

AUTOMATIC TELEPHONE ANSWERING AND MESSAGE RECORDING SYSTEM

Filed Dec. 16, 1960 5 Sheets-Sheet 5

INVENTORS
CHARLES M. MARTIN
ROBERT O. MYERS
KENNETH LE GROS
EMIL E. EVANS
EDWARD A. MARHEINE

BY C. A. Gulbrandsen
ATTY.

United States Patent Office 3,226,478

Patented Dec. 28, 1965

3,226,478

AUTOMATIC TELEPHONE ANSWERING AND MESSAGE RECORDING SYSTEM

Charles M. Martin, Pewaukee, Robert O. Myers, Waukesha, and Kenneth C. Le Gros, Emil E. Evans, and Edward A. Marheine, Milwaukee, Wis., assignors, by mesne assignments, to Automatic Electric Laboratories, Inc., Northlake, Ill., a corporation of Delaware Filed Dec. 16, 1960, Ser. No. 76,311

5 Claims. (Cl. 179—6)

This invention relates to automatic telephone answering and message recording systems comprising a device, or machine, adapted to be connected to a local subscriber's telephone line for the purpose of automatically receiving and transmitting messages over the central office telephone line during the absence of the subscriber from his telephone.

The main object of this invention is to provide a simplified automatic telephone answering and recording device that is economical, efficient and reliable in operation, which may be located on the telephone subscriber's premises, with means in the device by which incoming telephone signals may be automatically answered, an outgoing message may be reproduced and transmitted to the calling party, an incoming message may be received and recorded and said transmitted and received message may be reproduced for the subscriber.

In accordance with this invention, the above-noted objective is satisfactorily met by the provision of a unitary device suitable for mounting and use on a desk or table, the general features of which include the provision of magnetic recording apparatus and of novel circuit arrangements and control elements to provide means whereby talk-out (outgoing) and talk-in (incoming) messages are recorded on separate recording mediums. Additional novel circuit elements and control apparatus are provided, whereby the talk-out message may be checked by the subscriber, the talk-out message is transmitted to the calling party in response to the machine answering an incoming call, a function signal is transmitted at the end of the talk-out message to inform the calling party that he may start talking upon termination of the signal, and the signal is further utilized by the machine to condition the machine for recording the talk-in message. The talk-out message and function signal is transmitted to the calling party in response to the answering of the incoming call by the machine, while each talk-in message is recorded in sequence, with means being provided under control of the subscriber for playing back any one, or all, of the recorded messages. Further means is provided under control of the subscriber for erasing the talk-in messages.

In accordance with the present invention, the automatic telephone answering and recording device includes a control section provided with improved and novel circuit arrangements, whereby in response to the operation of a selected rewind function, alternating current and direct current rectified therefrom operate respective rewind control means to operate the rewind motor over an alternating current path in a rewind operation of the device, and the subsequent restoring of the alternating current-operated control means opens the operating circuit to the rewind motor and operates the forward motor over a direct current path to stop the device from the rewind operation with the direct current-operated control means maintaining the forward motor operated for a specific interval of time. Further, in response to the operation of a selected playback function, alternating current and direct current rectified therefrom operate the capstan motor and playback control means respectively, whereby the playback control means operates the forward motor and rewind motor in series over an alternating current path, and means is provided for maintaining the control means operated for a specific time interval after the capstan motor has deenergized, thereby maintaining the operation of the forward and rewind motors to stop the device from the playback operation. Still further, in response to the operation of a selected fast forward function, direct current rectified from alternating current operates fast forward control means, which operates the forward motor over an alternating current path, with the fast forward control means being maintained operated for a specific time subsequent to release of the selected fast forward function, whereby the rewind motor is maintained operated for the specific time over a direct current path under control of the fast forward control means to stop the device from the fast forward operation.

In a preferred embodiment of this invention, the recording mediums are disclosed as consisting of magnetic tape, wherein the tape for the talk-out message comprises a relatively short endless loop of tape that is driven in one complete revolution from the start to the stop position during each cycle. The talk-in message tape, which is capable of recording a total message length of approximately two hours, is wound on a supply reel and is rewound on a takeup reel as the talk-in messages are received and recorded thereon. Means is provided for rewinding the tape onto the supply reel in order to playback or erase the message, and for repeating these various operations as the case may require.

The nature of the invention and its distinguishing features and advantages will be more clearly understood from the following detailed description and the accompanying drawings in which:

FIGS. 1 through 4, inclusive, show in schematic form, the complete circuit arrangement of the improved automatic telephone answering and message recording machine embodying the novel features of the invention.

In its preferred form, such as disclosed in the present application, a brief general description of the invention will now be given.

*General description*

Figure 5:
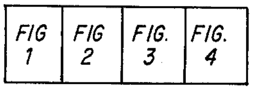
FIG. 5 is a figure-number diagram showing the arrangement of the sheets of drawings corresponding to FIGS. 1 through 4, inclusive.
Figure 2:
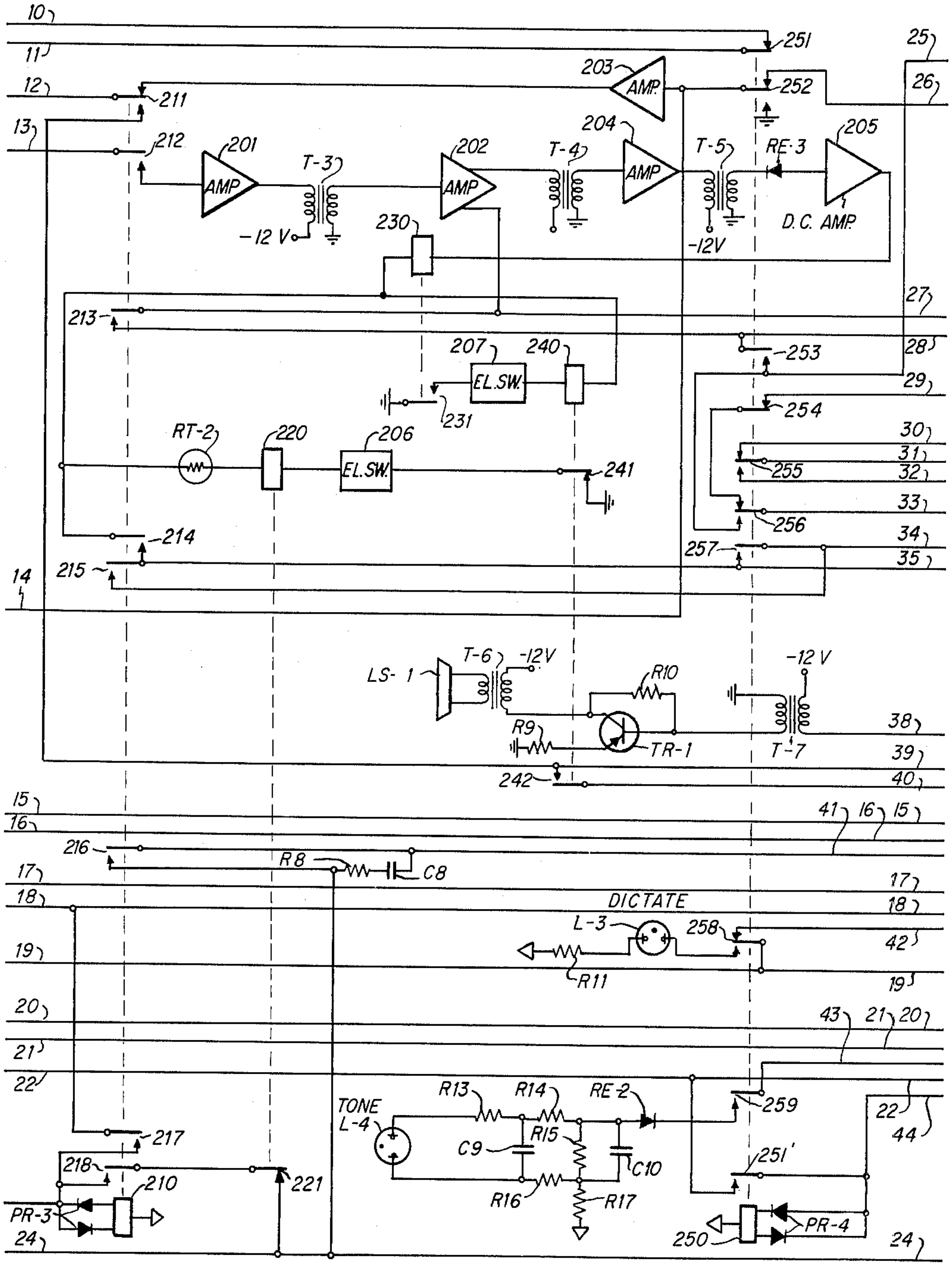
Figure 3:
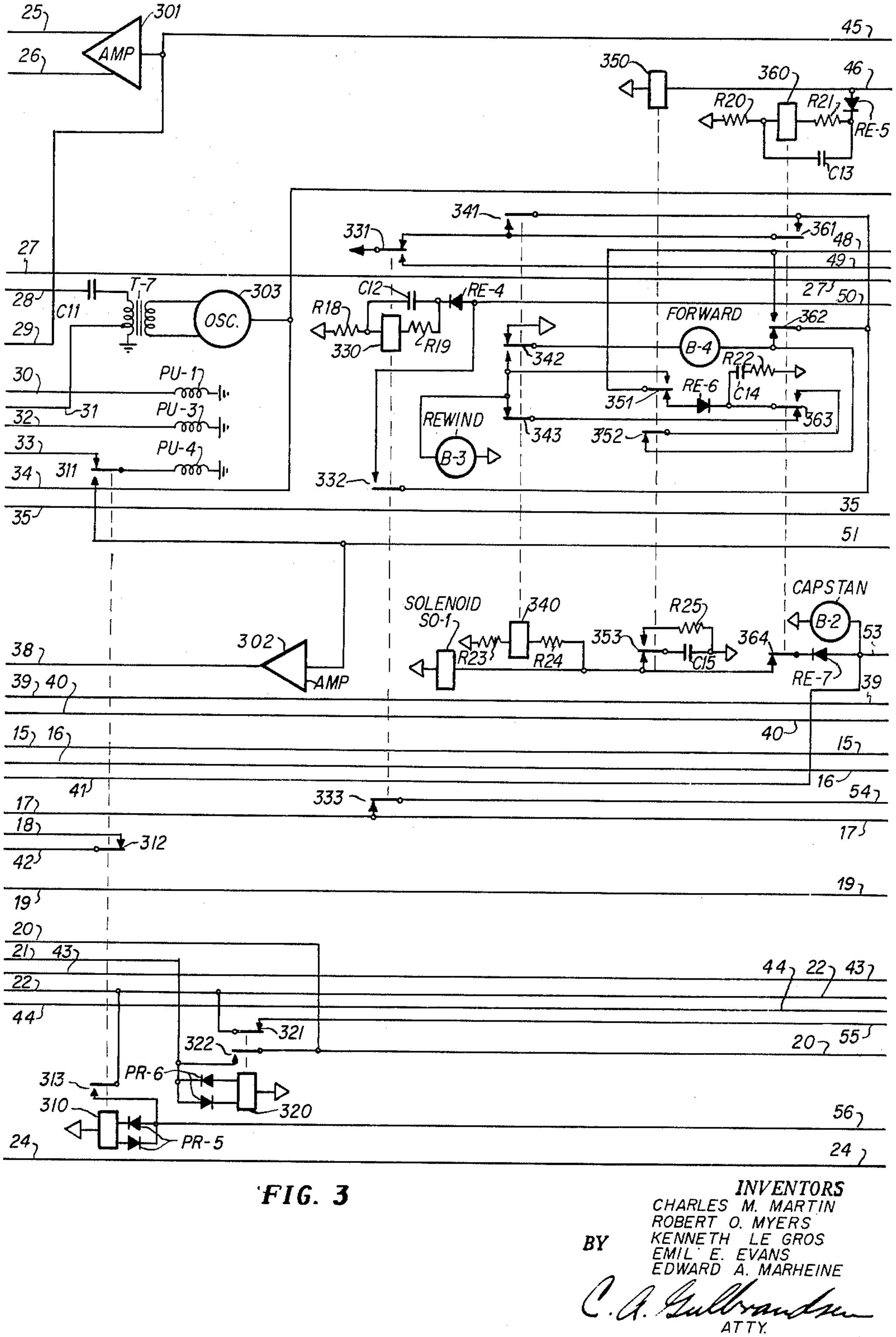

Reference will be had with FIGS. 1 through 4 and FIGS. 6 and 7 of the drawings, with FIGS. 1 through 4, arranged according to the figure number diagram represented in FIG. 5, for this general description.

Figure 1:
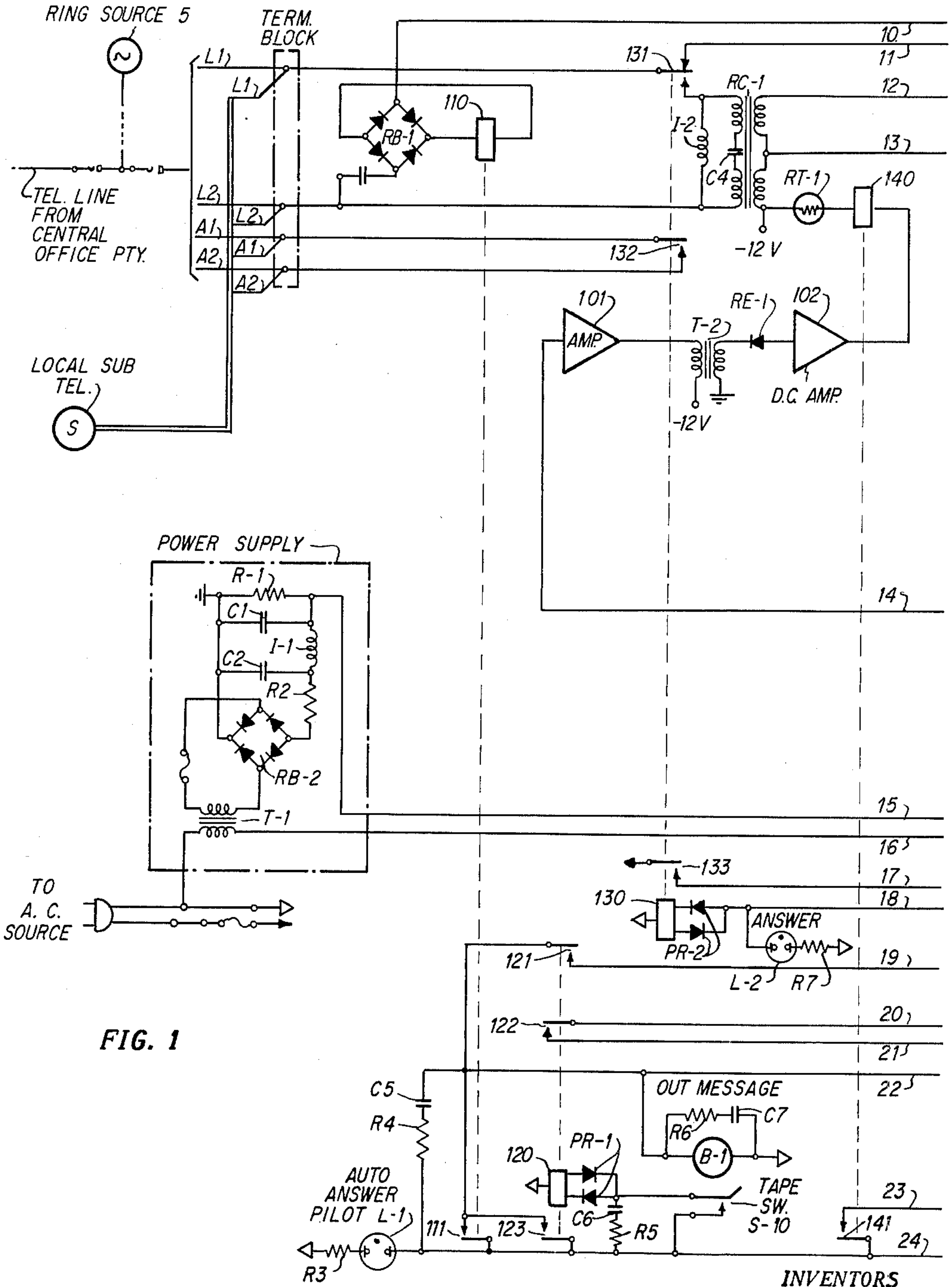

Before starting the general description, it is thought advisable to discuss the various components of the machine in order to better understand the subsequent detailed operational descriptions. The power supply arrangement as shown in the box diagram in FIG. 1 is disclosed as having the primary winding of its transformer T-1 connected through the various selective control push buttons. The −12 volt output from the power supply is shown as being extending by way of contacts of certain of the push buttons to the oscillators such as 303 and 401 and to the electronic switches such as 206 and 207. In order to eliminate numerous conductors and to simplify the drawings, it is assumed that this −12 volt supply is directly connected to all of the points in the drawings that are marked as −12 volts.

It will be appreciated that while the various components shown in the drawings as representing amplifiers, oscillators and electronic switches may be of any suitable type, these components in their preferred form, in applicant's improved machine, consist of transistors and their associated circuit elements arranged in a well-known and suitable manner, whereby the various desired functions are satisfactorily accomplished.

Figure 4:
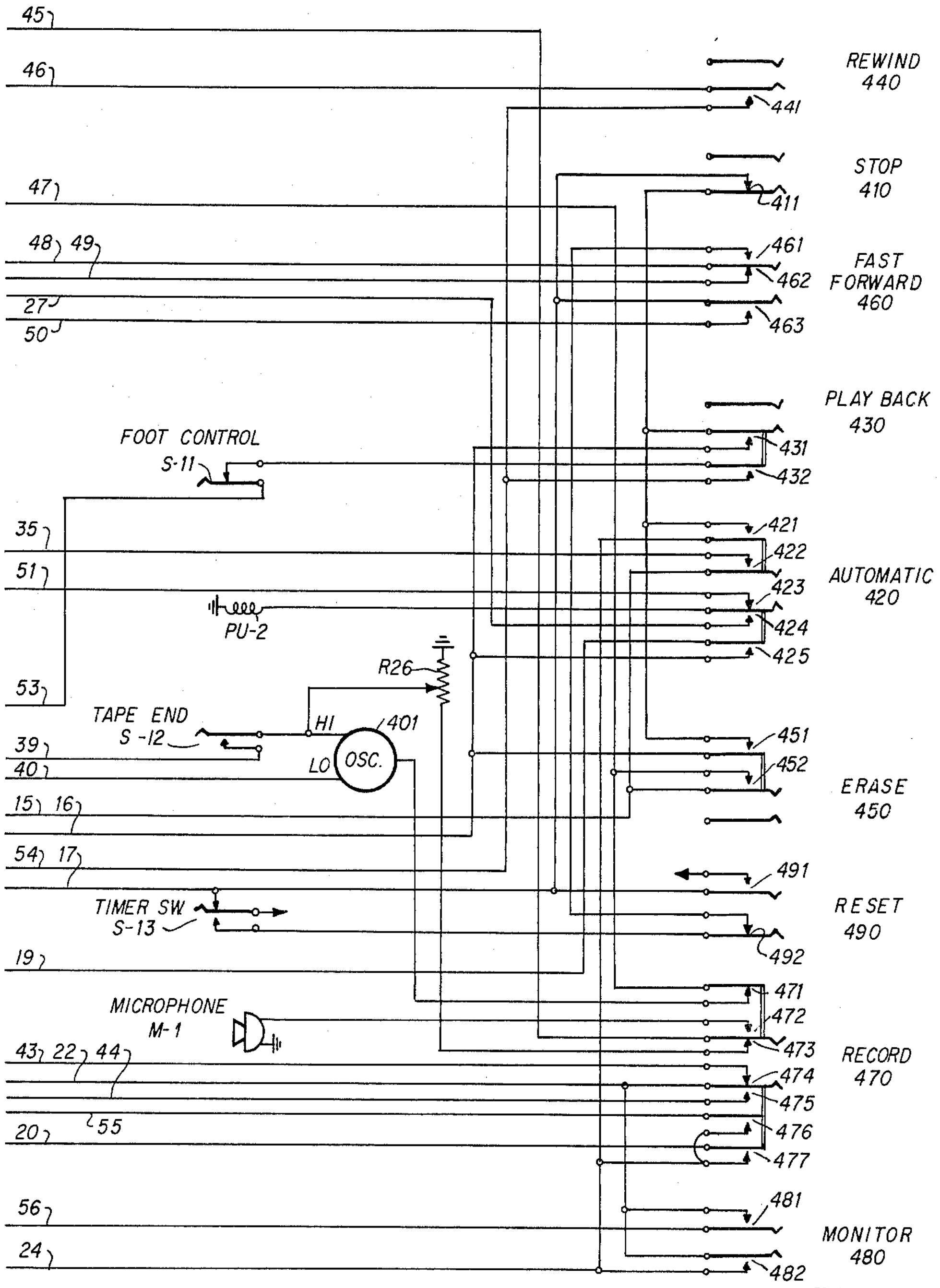

The push buttons as shown in FIG. 4 are arranged whereby certain ones such as the STOP, PLAYBACK and AUTOMATIC push buttons are locked operated in a suitable manner in response to a first operation, or depressing, thereof. Other of the push buttons do not lock operated and are required to be held depressed during the entire desired particular operation. It is specifically pointed out that in view of the use of a suitable and well-known mechanical linkage arrangement (not shown), only one locking type push button at a time can lock in its depressed or operated position and that in order to unlock and restore the locked push button to normal, any one of the other locking type push buttons must be depressed. It is further pointed out that the contacts controlled by the STOP push button are arranged to be opened by the push button during the time that it is locked in its depressed position. Therefore, the depressing of any one of the other locking push buttons not only causes the STOP push button to restore, but further results in the closing of its contacts.

Before the machine can successfully be operated to automatically answer an incoming telephone call from the central office line, transmit a pre-recorded outgoing message to the calling party and record an incoming message, it will be assumed that the machine must first be operated to record a particular desired outgoing message by the local telephone subscriber S. Therefore, AUTOMATIC push button 420 is depressed to unlock STOP push button 410 and lock itself operated for energizing the machine. The RECORD push button 470 is depressed and held in this condition to connect microphone M–1 to the preamplifier 301, to start the out-message motor B–1 to pull the outgoing message tape across the out-message dictate pick-up head PU–4 and further operate relays to condition the machine for the record operation. The particular outgoing message is dictated into microphone M–1, where it is transmitted as voice frequency signals to preamplifier 301. This voice signal is amplified by preamplifier 301 and transmitted to pick-up head PU–4 and recorded on the outgoing message tape in a well-known manner. The RECORD push button 470 is released at the end of the dictated message to connect the −12 volts to oscillator 401, which thereupon conducts to transmit a high frequency tone to preamplifier 301, where this tone is amplified and extended to pick-up head PU–4 and recorded on the outgoing message tape. It is pointed out at this time that this high frequency tone must be recorded on the tape for a period of time equal to at least two and one-half seconds, and if this tone is not recorded on the tape for this period of time, tone lamp L–4 will not light, which is an indication that the message is too long and that the record operation must be repeated and the message shortened in order to record the high frequency tone for the above-mentioned time interval.

If it is desired to check the above-recorded outgoing message, MONITOR push button 480 is depressed to start the out-message motor and operate a relay to connect the outgoing message pick-up head PU–4 to amplifier 302. As the outgoing message tape is pulled across pick-up head PU–4, the outgoing message is transmitted thereby to amplifier 302 where the message is further amplified and extended to the transistor amplifier TR–1. This message is further amplified and extended to loudspeaker LS–1, where the outgoing message is audibly checked.

When the local subscriber S leaves his office and desires to have the machine automatically answer incoming telephone calls, transmit a pre-recorded message and record incoming messages, AUTOMATIC push button 420 is depressed and locks itself operated. Alternating current representing an incoming ringing signal received over the central office telephone line from ringing source 5 is rectified at the rectifier bridge RB–1 causing the operation of the ring relay 110, which starts the operation of the out-message motor B–1. In operating, out-message motor B–1 closes the tape switch S–10 to cause the operation of relays, resulting in connecting the telephone line to the repeat coil RC–1. The tape is pulled across pick-up head PU–4 and the outgoing message is extended thereby to preamplifier 301, where it is amplified and further extended to amplifier 203, with this message thereafter being extended to repeat coil RC–1 and further extended out over the central office telephone line to the calling subscriber. The high frequency tone at the end of the outgoing message serves two purposes, the first being to inform the calling subscriber that he may start talking at the end of the tone, and the second being to cause the subsequent operation of the mid cycle shift relay 210, which energizes the incoming message recorder mechanism to prepare the machine for recording the incoming message and disconnects the outgoing message amplifiers. The capstan motor B–2, solenoid SO–1 and play relay 340 are operated in response to the operation of the mid cycle shift relay 210, whereby capstan motor B–2 is effective for pulling the incoming message tape across the pick-up head PU–2 and the operation of play relay 340 causes the energization of rewind motor B–3 and forward motor B–4 in series to provide a low torgue for take-up and back pressure on the tape during the recording of the incoming message. The incoming message is received at repeat coil RC–1 over the line conductors L1 and L2 and extended by way of the right-hand windings thereof to amplifier 201, where this signal is amplified, filtered and extended to amplifier 202. The signal is further amplified and extended to pick-up head PU–2 for recording the message on the incoming message tape. The machine will remain in the operating or recording condition as long as the incoming message is continuously received, however should the incoming message cease for a period of approximately 4 seconds, apparatus in the machine is operated to extend a warning tone out over the telephone line as an indication to resume talking, and should this period of silence continue for an additional 8 seconds, the machine will time itself out and disconnect itself from the telephone line. If the calling party resumes talking before the expiration of the 8 second time interval, the voice control arrangement and timing arrangement of the machine will remove the warning tone from the line and the machine will reset itself for continued operation to record the incoming message. At the end of the incoming message, the machine will time itself out and disconnect itself from the telephone line after the expiration of the total 12 second time interval.

When returning to his office, it is necessary that the local subscriber S first operate the machine in its rewind operation before he can playback any of the messages that were recorded during his absence. In order to condition the machine to operate properly for the rewind operation, it is necessary that AUTOMATIC push button 420 be released, which is accomplished as described hereafter. In order to initiate the Rewind operation, REWIND push button 440 is depressed and locked in this condition to unlock AUTOMATIC push button 420 and also cause the operation of rewind relay 350 and memory relay 360. The operation of these two relays completes a circuit to only the rewind motor B–3, which thereupon operates to rewind the tape from the take-up reel TU–1 to the supply reel SU–1. During this operation, a constant observation of the tape indicator TI–1 is made and REWIND push button 440 is released at the time that the tape indicator TI–1 indicates zero.

The machine may now be operated directly from the above-mentioned Rewind operation subsequent to the release of REWIND push button 440 by depressing PLAYBACK push button 430, which completes a series circuit for energizing capstan motor B–2, play relay 340 and the solenoid SO–1 and for completing a circuit to energize the power supply. Play relay 340 completes a circuit for energizing forward motor B–4 and the rewind motor B–3 in series. Capstan motor B–2 operates to pull the incoming message tape across pick-up head PU–2, while forward motor B–4 and rewind motor B–3 are energized over the above low torque circuit to provide a constant back pressure of the tape on the pick-up head PU–2 to maintain proper tension on the tape. The message is transmitted by means of pick-up head PU–2 to playback amplifier 302, with this signal being amplified thereby and extended to transistor amplifier TR–1, where the signal is further amplified and extended to loudspeaker LS–1 for audible reproduction.

In order for the machine to be operated in the fast forward operation, it is assumed that the machine has previously been operated in its Rewind operation with the object being to advance the tape beyond the first-recorded incoming messages to select a later-recorded message for the playback thereof. In order to initiate the operation of the tape transport mechanism in the fast forward operation, FAST FORWARD push button 460 is depressed and held in this condition, to operate the fast forward relay 330. The fast forward relay 330 completes a circuit for operating the forward motor B–4 at fast speed under full current, thereby winding the tape at a fast speed from the supply reel SU–1 onto the take-up reel TU–1. When it is desired to stop the tape transport mechanism, FAST FORWARD push button 460 is released, to open circuits to stop the fast forward motor B–4 and to release the fast forward relay 330.

If it is assumed that the machine has been operated to play back the recorded incoming messages, and that these messages are no longer needed, the incoming message on the incoming tape may be erased by operating the machine in its Rewind operation and to simultaneously depress the ERASE push button 450. The machine will operate in the Rewind operation as previously described, with the depressing of push button 450 completing a circuit to render oscillator 303 operative. A portion of the output from oscillator 303 is extended to pick-up head PU–1, where the incoming message is erased during the time that the tape is pulled across pick-up head PU–1 at the time that the machine is operating in its Rewind operation. Therefore, these two operations take place simultaneously so that at the time that the tape is rewound onto the supply reel SU–1 from the take-up reel TU–1, the previous incoming message is being erased. REWIND push button 440 and ERASE push button 450 are released at the time that the tape indicator TI–1 reaches zero to stop the operation.

It will be appreciated that during the particular above-mentioned operations of the tape transport mechanism, various circuits using direct current voltages impressed at particular intervals on the various motors are utilized for braking purposes to bring the machine to a stop and to prevent tape breakage and to eliminate unnecessary tape travel when the various motors come to a stop. These direct current braking circuits will be described in detail in the subsequent detailed operational descriptions.

Having covered general descriptions of the machine and apparatus, detailed operational descriptions will now be given relating to the numerous practical applications such as selected by the local telephone subscriber.

*Automatic operation*

Before starting the above-mentioned operational description, it is desired to point out that in order to reduce the number of conductors in the drawings, filled in and non filled in symbols of the conventional triangle type have been used to respectively indicate the fused and return conductors from the alternating current source. These symbols are used throughout the drawings and the fused and return titles are used throughout the specification. Reference will be had with FIGS. 1 through 4, inclusive for this description.

It is assumed that in order to provide automatic operation of the machine during the time that the local subscriber is away from his telephone, the power cord is plugged into a conventional source of alternating current, with AUTOMATIC push button 420 being depressed. It is thought advisable to mention that AUTOMATIC push button 420 will lock in its operated, or depressed, condition.

In response to the operation of AUTOMATIC push button 420, a circuit is completed for lighting the automatic answer pilot lamp L–1, with this circuit extending from the fused side of the line, the break contact of timer switch S–13, contacts 411 of STOP push button 410, contacts 421 of AUTOMATIC push button 420, down over conductor 24 and through automatic answer pilot lamp L–1 and resistance R3 to the return side of the line. No further operations will take place at this time.

It is assumed that an incoming call is routed by way of line conductors L1 and L2 to the terminal block shown in FIG. 1 and that ringing current is placed on these line conductors by ringing source 5 in a well-known manner. This alternating ringing current is rectified by means of rectifier bridge RB–1, with this rectified current operating ring relay 110 in an obvious and well-known manner.

In actuating its contatcs, ring relay 110 closes contacts 111 to complete a circuit for starting the operation of the out-message motor B–1. This circuit for operating out-message motor B–1 may be traced as extending from the fused side of the line, the break contacts of the timer switch S–13, contacts 411 of STOP push button 410, contacts 421 of AUTOMATIC push button 420, conductor 24, contacts 111 and through the out-message motor B–1 to the return side of the line. Out-message motor B–1 operates to drive the capstan CA–2 (FIG. 7), associated tape mechanism (not shown) and tape in a well-known manner.

Although not shown in detail, tape switch S–10 may be described as having an actuating arm with its outer end bent at right angles thereto and having the extreme end thereof formed into the shape of a V. The middle of the V is slightly biased against the out-message tape during the time that the out-message mechanism is operating and the out-message is being transmitted, whereby the contacts of tape switch S–10 are closed. An elongated slot is provided in the section of the tape immediately following the recorded high frequency tone, and before the beginning of the out-message, whereby the V end of the actuating arm protrudes through the slot to open the contacts of the tape switch S–10. The out-message tape is pulled over tape switch S–10, whereby tape switch S–10 closes in a suitable manner for completing a circuit to operate the tape switch relay 120. This circuit for operating tape switch relay 120 may be traced as extending from the fused side of the line, the break contacts of timer switch S–13, contacts 411 of STOP push button 410, contacts 421 of AUTOMATIC push button 420, conductor 24, the make contacts of tape switch S–10, polarizing rectifiers PR–1 and through the windings of tape switch relay 120 to the return side of the line.

In actuating its contacts, tape switch relay 120 closes contacts 121 to complete a circuit for operating the line seizure relay 130 and also completes an alternating current path to the primary winding of power transformer T–1, prepares a point in the future energizing circuit of record limit relay 320 at contacts 122 and at contacts 123 shunts contacts 111 to provide an alternate circuit to maintain the out-message motor B–1 in its operating condition. The circuit for energizing the line seizure relay 130 may be traced as extending from the fused side of the line, the break contacts of timer switch S–13, contacts 411 of STOP push button 410, contacts 421 of AUTOMATIC push button 420, conductor 24, contacts 111, 121, conductor 19, break contacts of armature 258, conductor 42, contacts 312, conductor 18, polarizing rectifiers PR–2 and through the windings of the line seizure relay 130 to the return side of the line. It will be noted that the answer lamp L–2 is also lighted over the same circuit as traced for the line seizure relay 130. The circuit for energizing the primary winding of power transformer T–1 may be traced as extending over the same path as traced for the line seizure relay 130, with the exception that the circuit continues on from contacts 121 and conductor 19, through contacts 425 of AUTOMATIC push button 420, back through conductor 16, and through the primary winding of power transformer T–1 to the return side of the line.

In actuating its contacts, line seizure relay 130 opens the circuit to the ring relay 110 at the break contacts of armature 131, connects the conductors L1 and L2 from the telephone line to the repeat coil RC–1 at the make contacts of armature 131, closes contacts 132 to provide control functions at the local subscribers telephone in case his subset is of the multi-line key type and at contacts 133 closes a path in parallel with the break contacts of timer switch S–13 to provide an alternate supply from the fused side of the alternating current source to maintain all of the previously-traced circuits complete. Ring relay 110 restores at this time and opens contacts 111, which have no effect on the subsequent operations of the machine during the remainder of the description for this section.

It will be pointed out at this time that when the primary winding of power transformer T–1 became energized, the rectifier bridge RB–2 rectified the alternating current induced in the secondary winding and this rectified current is hereafter used as the −12 volt supply and biasing voltage to the various amplifiers, D.C. amplifiers, electronic switches and oscillators throughout the machine. It will further be pointed out that this −12 volt supply is applied over conductor 15 and through contacts 422 of the automatic push button 420 and out over conductor 35 to contacts of the various relays for control application thereof. To eliminate many condutcors in the drawings, taps are shown as an indication that the −12 volt supply as mentioned above is connected to them.

As previously mentioned, out-message motor B–1 operates to pull the tape across the outgoing message pick-up head PU–4. Pick-up head PU–4 transmits the out-message from the tape over a circuit traced through the break contacts of armature 311, conductor 33, the break contacts of armature 256, contacts 254, conductor 29 and into the outgoing message preamplifier 301. This message is amplified in a well-known manner and extended by way of conductor 26 and the break contact of armature 252 to the amplifier 203, where the signal is further amplified and extended over a circuit including the break contacts of armature 211, conductor 12 and into the right-hand windings of the voice repeating coil RC–1. This signal, or message, is induced into the left-hand windings of voice repeating coil RC–1 and extended out over line conductors L1 and L2 to the calling party.

The pre-recorded message that is transmitted out to the calling party may be of the nature wherein he is informed that he has called a partciular number, that the subscriber associated with that particular number is not present, that the call has been answered by a telephone answering and recording machine and that if he desires to leave a message for the particular party that he has called, a tone is placed on the line for a two and one-half second time duration at the end of the outgoing message and that at the end of the tone he is to start talking and his message will be recorded.

At the end of the transmission of the outgoing message to the calling party, the above-mentioned tone is transmitted by way of pick-up head PU–4 to the preamplifier 301 over the same circuit as previously traced, where it is amplified and extended over a previously traced path into amplifier 203 to be further amplified and from there over a previously traced path to the right-hand windings of the voice repeating coil RC–1. This same tone is induced into the left-hand windings of the voice repeating coil RC–1 and extended by way of the line conductors L1 and L2 to the calling party. This tone signal is further extended from a junction point where it enters amplifier 203 down over conductor 14 to the amplifier filter 101, where this tone is amplified and filtered to allow only a tone signal of a predetermined frequency to pass into the primary, or left-hand, winding of transformer T–2. This signal is induced into the right-hand winding of transformer T–2 and is rectified by means of RE–1 and extended as an input to the direct current amplifier 102. The output from D.C. amplifier 102 is further extended through relay 140, which thereupon operates if the signal is steadily received for a minimum time duration of at least two and one-half seconds. The temperature controlled resistance RT–1 prevents false operation of relay 140 if transient signals should be present for various reasons.

In actuating its contacts, relay 140 completes a circuit at contacts 141 for operating the mid cycle shift relay 210. This circuit for operating mid cycle shift relay 210 may be traced as extending from the fused side of the line, the break contacts of timer switch S–13, contacts 411 of STOP push button 410, contacts 421 of AUTOMATIC push button 420, down through conductor 24, contacts 141, conductor 23, the polarizing rectifiers PR–3 and through the windings of relay 210 to the return side of the line.

In actuating its contacts, mid cycle shift relay 210 opens the out-message circuit at the break contacts of armature 211 to prevent further transmission of an out-message or signal, prepares a point in a later described warning tone circuit at the make contacts of armature 211, completes the circuit from the voice repeating coil RC–1 at contacts 212 to extend the subsequent incoming message to the incoming message amplifier 201, completes a circuit at contacts 213 for applying a high frequency bias to the recording pick-up head PU–2, applies the −12 volt potential from the power supply to various sections of the incoming record amplifier apparatus at contacts 214, applies the −12 volt potential from the power supply to the oscillator 303 at contacts 215, completes a circuit for operating the capstan motor B–2, solenoid SO–1 and play relay 340 of the incoming message recorder mechanism in parallel at contacts 216 and completes an alternate circuit at contacts 217 and 218 for locking line seizure relay 130 and itself operated over an abvious path extending by way of contacts 221 to the previously traced fused side of the line. The closing of contacts 217 and 218 also completes an alternate path for maintaining power to the primary winding of power transformer T–1.

Before tracing the various circuits that are completed by the operation of mid cycle shift relay 210, it is considered advisable to mention that it will be assumed that at the end of the tone from the out-message tape, the tape (as it is being advanced to normal by out-message motor B–1) will cause tape switch S–10 to open its contacts in a suitable manner, thereby opening the circuit to tape switch relay 120. Tape switch relay 120 thereupon restores and opens the previously described circuit to the line seizure relay 130 to stop the operation of the out-message motor B–1. Line seizure relay 130 however, will remain operated over the above-mentioned alternate locking circuit.

The application of the −12 volts to the incoming record apparatus may be traced as extending over the following circuit: the −12 volts from the power supply, conductor 15, contacts 422 of AUTOMATIC push button 420, conductor 35, contacts 214 and thereafter in multiple to one side of the windings of the relays 220, 230 and 240. This same −12 volts is also supplied over a circuit extending as previously described to the conductor 35 and down through contacts 215, conductor 34 and to oscillator 303. Also, this −12 volts extends over the previously traced path including conductor 34 to a terminal having conductor 47 connected thereto, contacts 471 of the RECORD push button 470 and to oscillator 401. The circuit for operating the capstan motor B–2, solenoid SO–1 and play relay 340 may be traced as extending from the fused side of the line, the break contacts of timer switch S–13, contacts 411 of STOP push button 410, contacts 421 of AUTOMATIC push button 420, conductor 24, up through contacts 216, conductor 41, and (1) up through the capstan motor B–2 to the return side of the line and (2) rectified by rectifier RE–7, contacts 364, and in multiple through the windings of solenoid SO–1 and play relay 340 respectively to the return side of the line. The alternate path completed by contacts 217 and 218 for maintaining power to the primary winding of power transformer T–1 may be traced as extending from the fused side of the line, break contacts of timer switch S–13, contacts 411 of STOP push button 410, contacts 421 of AUTOMATIC push button 420, conductor 24, contacts 221, 218, 217, to the right over conductor 18, contacts 312, break contacts of armature 258, to the right over conductor 19, contacts 425 of AUTOMATIC push button 420, conductor 16 and through the primary winding of transformer T–1 to the return side of the line.

Although not shown in detail, the pressure roller engaging magnet, or solenoid, SO–1 exerts no pressure against the capstan CA–1 of capstan motor B–2 in its normal deenergized condition, whereby operation of the capstan motor B–2 is ineffective for pulling, or controlling, the tape. However, when solenoid SO–1 is energized, pressure roller RO–1 exerts sufficient force against the capstan CA–1, whereby capstan motor B–2 is effective to pull the tape across the pick-up heads.

In actuating its contacts, play relay 340 completes a circuit for energizing the forward motor B–4 and the rewind motor B–3 in series at contacts 341 and the make contacts of armature 342, while it performs no useful function at the remainder of its contacts during the present operational description of this section. The circuit for forward motor B–4 and rewind motor B–3 may be traced as extending from the fused side of the line, break contacts of armature 331, contacts 341, break contacts of armature 362, the winding of forward motor B–4, make contacts of armature 342 and through the winding of rewind motor B–3 to the return side of the line. Capstan motor B–2 thereafter advances the incoming message record tape in a suitable manner, with the series-connected forward motor B–4 and rewind motor B–3 providing low torque for take-up and back pressure on the tape also in a suitable manner. The incoming message recorder mechanism is now in operation and conditioned to record the incoming message as received over the central office line from the calling party.

The incoming message, representing voice signals as received from the calling party, is fed over line conductors L1 and L2 to the left-hand winding of voice repeating coil RC–1, induced into the lower right-hand winding thereof and extended by way of conductor 13 and contacts 212 to amplifier 201 where this signal is amplified and filtered and the output is applied to the left-hand winding of transformer T–3. The signal is induced into the right-hand winding of transformer T–3 and extended to amplifier 202 where this signal is further amplified and extended out and down over a circuit including conductor 27, contacts 424 of AUTOMATIC push button 420, and out to pick-up head PU–2 for recording the incoming message on the incoming message record tape in a well-known manner. Returning to amplifier 202, it will be seen that a portion of the amplified voice signal is also extended to the left-hand winding of transformer T–4, where this signal is induced into the right-hand winding thereof and applied to the voice control preamplifier 204. This signal is extended to the left-hand winding of transformer T–5, induced into the right-hand winding thereof, rectified by rectifier RE–3 and applied to the direct current amplifier 205 where this signal is sufficiently amplified to operate voice control relay 230.

In actuating its contacts 231, relay 230 applies a ground potential to the electronic switch 207, which is arranged in a well-known manner to operate only upon removal of this particular ground.

At this point in the operational description it will be noted that the machine will remain in the operating, or recording, condition as long as a message is received from the calling party, with the incoming message being recorded on the incoming message record tape by means of pick-up head PU–2 as previously mentioned. Also, an erase signal is transmitted from oscillator 303 over an obvious circuit to the erase pick-up head PU–1 to erase any previous message on the tape ahead of the present message. However, should the calling party temporarily cease talking or finish his message, whereby there is an absence of a voice signal for a period of time exceeding 4 seconds, there is no input to the D.C. amplifier 205, and as a result no output, whereby voice control relay 230 will restore. The restoring of voice control relay 230 removes the ground potential at contacts 231 from electronic switch 207, with this switch thereafter completing an obvious circuit for operating the talk down relay 240.

In actuating its contacts, talk down relay 240 removes ground potential from electronic switch 206 at contacts 241 and completes a circuit at contacts 242 for transmitting a low frequency tone to the line of the calling party. This circuit for transmitting the low frequency tone to the line of the calling party may be traced as extending from oscillator 401, conductor 40, contacts 242, make contacts of armature 211, conductor 12 and through the right-hand winding of voice repeating coil RC–1, with this tone being induced into the left-hand windings of voice repeating coil RC–1 and thus extended out to the calling line over conductors L1 and L2. This low frequency tone serves to inform the calling party, if he still is on the line, that the time out equipment of the machine has started functioning and if he does not commence talking within a period of approximately 8 seconds, the machine will time itself out and disconnect from the line. If it is assumed that the calling party starts talking in response to receipt of the low frequency tone, the voice frequency signals corresponding to the incoming message are rectified as previously described to reoperate the voice control relay 230, which thereupon applies the previously mentioned ground potential to electronic switch 207 to cause this switch to restore talk down relay 240, which thereupon removes the low frequency tone from the line.

If it is assumed however, that the calling party has hung up, or at least does not talk within the aforementioned 8 seconds after receipt of the low frequency tone, electronic switch 206 will complete a circuit for operating the time out relay 220, with temperature controlled resistance RT–2 preventing false operations from transient signals.

Time out relay 220 operates to open contacts 221, thereby opening the previously described locking circuits to restore both the line seizing relay 130 and the mid cycle shift relay 210. Line seizing relay 130 restores its armature 131 to normal, thereby disconnecting repeat coil RC–1 from the line conductors L1 and L2 and again connecting them to the rectifier bridge RB–1 and the ring relay 110 as previously described. Mid cycle shift relay 210 restores its contacts to normal and at its armature 211 again connects the outgoing message amplifier 203 to the voice repeating coil RC–1 and removes the low frequency tone from transmission to the repeating coil. The incoming message circuit to amplifier 201 is disconnected at contacts 212, the −12 volt potential is removed from the various apparatus due to the restoring of contacts 213, 214 and 215, the opening of contacts 216 opens the previously traced circuits to capstan motor B–2, solenoid SO–1 and play relay 340, while the opening of contacts 217 and 218 opens additional points in the previously mentioned locking circuits of line seizure relay 130 and mid cycle shift relay 210.

In response to being deenergized, capstan motor B–2 thereupon coasts to a stop, with solenoid SI–1 and play relay 340 being held operated in an obvious manner for a predetermined time of approximately 2 seconds due to the direct current charge on condenser C15. Therefore, as capstan motor B–2 is coasting to a stop as mentioned, the forward motor B–4 and rewind motor B–3 are maintained energized by the still operated play relay 340 for the 2 second time delay to eliminate any over-run or travel of the tape during the time that the capstan motor B–2 is stopping. At the end of this predetermined time, condenser C15 will be completely discharged, whereupon solenoid SO–1 and play relay 340 restore, with solenoid SO–1 no longer engaging the capstan C–1 and the play relay 340 opening the circuits to the forward motor B–4 and the rewind motor B–3 at the contacts of armature 341 and 342 whereby they will also stop.

At this particular stage of the operational description, it will be noted that the machine has answered the incoming call, transmitted an outgoing message, recorded the incoming message and timed itself out in order to disconnect from the calling line and thereby condition itself to answer additional incoming calls, transmit the outgoing message and record their incoming messages in sequence.

*Record of outgoing message announcement*

Reference will be had with FIGS. 1 through 4 of the drawings, inclusive, during the operational description of the above-entitled section, wherein it is assumed that the machine is operated by the local subscriber S to record the outgoing message announcement that will be transmitted to each calling party, subsequent to the machine answering incoming calls therefrom.

In order for the machine to record the outgoing message announcement, it is necessary that the power cord is plugged into a conventional source of alternating current and that AUTOMATIC push button 420 be depressed and lock operated. It will be appreciated that the operation of AUTOMATIC push button 420 prepares and completes circuits such as described in the section entitled "Automatic Operation," namely, the lighting of the automatic answer pilot lamp L–1 over a circuit such as previously described.

In order to condition the machine for the dictate, or record, operation it is assumed that the non-locking RECORD push button 470 is depressed and held in that condition during the dictation of the complete outgoing message announcement.

In actuating its contacts, RECORD push button 470 opens contacts 471 to prevent the application of −12 volts from the power supply to oscillator 401, opens contacts 473 to open a point in the output circuit of the high frequency tone from oscillator 401, closes contacts 472 to connect microphone M–1 to the preamplifier 301, opens contacts 474 to disconnect the tone lamp L–4 and associated circuit elements from the machine during dictation, closes contacts 475, 476 and 477 for completing circuits to operate out-message motor B–1 and the out-message record relay 250. The circuit connecting microphone M–1 to preamplifier 301 may be traced as extending from microphone M–1, contacts 472, conductor 45 and to amplifier 301. The circuit for starting out-message motor B–1 may be traced as extending from the fused side of the line, the break contacts of timer switch S–13, contacts 411 of STOP push button 410, contacts 421 of AUTOMATIC push button 420, contacts 476 of RECORD push button 470, conductor 55, contacts 321, conductor 22, and through out-message motor B–1 to the return side of the line. The circuit for operating out-message record relay 250 may be traced as extending from the fused side of the line, the break contacts of timer switch S–13, contacts 411 of STOP push button 410, contacts 421 of AUTOMATIC push button 420, contacts 476 of RECORD push button 470, conductor 55, contacts 321, conductor 22, contacts 475 of RECORD push button 470, conductor 44, polarizing rectifiers PR–4 and the windings of out-mesage record relay 250 to the return side of the line.

Out-message motor B–1 operates in the same manner as described in the previous section entitled "Automatic Operation, wherein tape switch S–10 is closed when movement of the tape is started as previously described to complete a circuit for operating tape switch relay 120, also as previously described.

In actuating its contacts, the out-message record relay 250 closes its contacts 251′ to complete an obvious locking circuit for itself to conductor 22, opens contacts 251 for preventing the machine from receiving incoming calls during the time that the present outgoing message is being dictated and recorded, opens the output from pre-amplifier 301 to amplifier 203 at the break contacts of armature 252, renders amplifiers 203 and 101 inoperative by the application of ground potential at the make contacts of armature 252, prepares a point in the bias circuit from oscillator 303 to the out-message record pick-up head PU–4 at contacts 253, opens a point in the original circuit from the out-message pick-up head PU–4 to amplifier 301 at contacts 254, transfers the high frequency erase potential output of oscillator 303 from the incoming message erase pick-up head PU–1 to the out-message erase pick-up head PU–3 at the break and make contacts respectively of armature 255, opens the circuit from out-message pick-up head PU–4 to amplifier 301 at the break contacts of armature 256, connects the outgoing message circuit from amplifier 301 to the out-message pick-up head PU–4 at the make contacts of armature 256, completes a circuit at contacts 257 for applying the −12 volt potential from the power supply to oscillator 303, opens a point in the operating circuit of the line seizure relay 130 at the break contacts of armature 258, prepares a circuit for lighting the dictate lamp L–3 at the make contacts of armature 258 and at contacts 259 prepares a point in the circuit to the tone lamp L–4 and associated elements of the tone timing apparatus.

In actuating its contacts, tape switch relay 120 closes contacts 121 and 123 to complete circuits for lighting the dictate lamp L–3 and for energizing the primary winding of transformer T–1 of the power supply and at contacts 122 complete a circuit for energizing the record limit relay 320. The circuits for lighting the dictate lamp L–3 and for energizing the primary winding of transformer T–1 may be traced as extending from the fused side of the line through the break contacts of timer switch S–13, contacts 411 of STOP push button 410, contacts 421 of AUTOMATIC push button 420, conductor 24, contacts 123, 121, conductor 19, and (1) the make contacts of armature 258 and through dictate lamp L–3 to the return side of the line, and (2) from conductor 19, contacts 425 of AUTOMATIC push button 420, conductor 16 and through the primary winding of transformer T–1 to the return side of the line. The circuit for energizing record limit relay 320 may be traced as extending from the fused side of the line through the break contacts of timer switch S–13, contacts 411 of STOP push button 410, contacts 421 of AUTOMATIC push button 420, contacts 477 of RECORD push button 470, conductor 20, contacts 122, conductor 21, polarizing rectifiers PR–6 and through the windings of record limit relay 320 to the return side of the line.

In actuating its contacts, record limit relay 320 opens the previously described operating circuit of out-message motor B–1 and the previously mentioned locking circuit of the out-message record relay 250 at contacts 321 to prevent a second recycle operation of the out-message record equipment and completes its own locking circuit at contacts 322 over an obvious path. The out-message motor B–1 and the out-message record relay 250 however, are held operated over a path that is traced from the fused side of the line through the make contacts of timer switch S–13, contacts 411 of STOP push button 410, contacts 421 of AUTOMATIC push button 420, conductor 24, contacts 123 and (1) through the winding of out-message motor B–1 to the return side of the line, and (2) continues over condutcor 22, contacts 251′, polarizing rectifiers PR–4 and through the windings of the out-message record relay 250 to the return side of the line.

The local subscriber S now dictates the desired outgoing message by means of talking into microphone M–1, with the voice signals representing this dictated message being transmitted therefrom by way of contacts 472 of the RECORD push button 470 and conductor 45 to the preamplifier 301, where it is amplified and transmited over a circuit including conductor 25, the make contacts of armature 256, conductor 33, break contacts of armature 311 and to pick-up head PU–4 where the outgoing message is recorded on the out-message tape.

RECORD push button 470 is released at the end of the dictation of the outgoing message and the restoring of its contacts to normal, controls previously described circuits, whereby microphone M–1 is disconnected from the preamplifier 301, the −12 volts is connected to the oscillator 401, the high frequency output from oscillator 401 is extended over a later traced circuit to the outgoing message pick-up head PU–4 and the previously traced circuit to the record limit relay 320 is opened. The circuit for recording the high frequency tone immediately following the outgoing message may be traced as extending from the HI output of oscillator 401 through a portion or resistance R26, contacts 473 of RECORD push button 470, conductor 45, preamplifier 301, conductor 25, make contacts of armature 256, conductor 33, make contacts of armature 311 and through the pick-up head PU–4 to be recorded on the outgoing message tape.

It is important to mention at this time that the high frequency tone from oscillator 401 should be recorded on the outgoing message tape for a minimum time of approximately two and one-half seconds because, as mentioned in the section "Automatic Operation," whereby in addition to informing the calling party that he was to start talking at the end of the tone, it was also necessary that the amplified and rectified portion of this tone be applied to operate relay 140 to cause it to initiate the mid cycle shift operation of the machine, in order for the machine to convert from transmission of the outgoing message to recording the incoming message. Provision is made in the machine whereby it is insured that the duration of this tone is at least two and one-half seconds, whereby if it is assumed that the duration of the outgoing message is too long, the end of the outgoing message tape (as it is being driven by the out-message motor B–1) will cause the tape switch S–10 to open, thereby opening the circuit to the tape switch relay 120, which will restore its contacts 123 to open the previously traced circuit to the out-message motor B–1 and open the locking circuit to the out-message record relay 250, which will restore its contacts 259 and open the circuit for charging the tone R–C time delay network comprising resistors R13, R14, R15, R16, R17, condensers C9 and C10, rectifier RE–2 and tone lamp L–4 so that this circuit will not function and tone lamp L–4 will not light. The fact that tone lamp L–4 does not light when RECORD push button 470 is released at the end of dictation is an indication that the message is too long and that the tone from the oscillator 401 is unable to be recorded on the outgoing message tape for the required time length to initiate the mid cycle shift. In the event that the above message is too long as assumed, the message must be shortened and re-dictated following the same steps of operation as just described, with it being assumed that this time the message is shorter and that the required time duration of tone is also recorded on the outgoing message. Therefore, when the out-message motor B–1 drives the tape to the point where tape switch S–10 opens to restore tape switch relay 120, out-message motor B–1 will de-energize and stop and the out-message record relay 250 will also restore. It will also be noted in this case that the tone R–C time delay network will have sufficient time to charge the two condensers C9 and C10 and they in turn will discharge causing tone lamp L–4 to flash as an indication that the message has been recorded and that the recorded tone is also of the proper time duration.

At this particular stage of the operational description, it will be noted that the machine has recorded the outgoing message and with the release of tape switch relay 120, the stopping of the out-message motor B–1 and the restoring of the out-message record relay 250, the machine is conditioned for future operations.

*Outgoing message check*

Reference will be had with FIGS. 1 through 4 of the drawings, inclusive, during the operational description of the above-entitled section, where it is assumed that the machine is operated by the local subscriber S to check the outgoing message announcement that has been recorded in the previous section entitled "Record Of Outgoing Message Announcement" to insure that the outgoing message announcement is satisfactory in all respects.

In order for the machine to operate properly for checking the outgoing message announcement, it is necessary that the power cord be plugged into a conventional source of alternating current and that AUTOMATIC push button 420 be depressed and lock operated. It will be appreciated that the operation of AUTOMATIC push button 420 prepares and completes circuits such as previously described in the section entitled "Automatic Operation," namely the lighting of the automatic answer pilot lamp L–1 over a circuit such as previously described and the preparation of the circuits necessary to provide various operating current for the machine.

In order to condition the machine for the monitor, or check, operation it is assumed that the MONITOR push button 480 is depressed to initiate the operation of the machine to monitor the entire outgoing message announcement.

In actuating its contacts, MONITOR push button 480 completes circuits for energizing out-message motor B–1 and for operating out-message monitor relay 310. The circuit for energizing out-message motor B–1 may be traced as extending from the fused side of the line, the break contacts of timer switch S–13, contacts 411 of STOP push button 410, contacts 421 of AUTOMATIC pushbutton 420, contacts 482 of MONITOR push button 480, conductor 22, and through the winding of out-message motor B–1 to the return side of the line. The circuit for operating out-message monitor relay 310 may be traced as extending from the fused side of the line, break contacts of timer switch S–13, contacts 411 of STOP push button 410, contacts 421 of AUTOMATIC push button 420, contacts 482 of MONITOR push button 480, contacts 481 of MONITOR push button 480, conductor 56, and through the polarizing rectifiers PR–5 and the windings of out-message monitor relay 310 to the return side of the line.

Out-message motor B–1 operates as described in the previous sections, whereby the closing of the contacts of tape switch S–10 completes a circuit for operating the tape switch relay 120, which in turn operates to complete previously described circuits.

In actuating its contacts, out-message monitor relay 310 disconnects out-message pick-up head PU–4 from the output of preamplifier 301 at the break contacts of armature 311, connects out-message pick-up head PU–4 at the make contacts of armature 311 to the input of amplifier 302, opens contacts 312 to prevent the operation of line seizure relay 130 in the event of an incoming call and at contacts 313 completes its own locking circuit over an obvious path.

Responsive to the tape being advanced by the operation of out-message motor B–1, the signal from the outgoing message tape is extended by way of pick-up head PU–4, and the make contacts of armature 311 to amplifier 302 where this signal is amplified and extended by way of conductor 38 to the right-hand winding of transformer T–7. This signal is induced into the left-hand winding of transformer T–7 and extended as an input to the transistor amplifier TR–1 where it is further amplified and applied to the right-hand winding of transformer T–6. This signal is thereafter induced into the left-hand winding of transformer T–6 and extended to loudspeaker LS–1 where the outgoing message is audibly reproduced and thereby checked.

If the outgoing message is satisfactory, MONITOR push button 480 is released to open the previously traced circuits at its contacts 481 and 482. Out-message monitor relay 310 will remain energized and out-message motor B–1 will remain operating until tape switch S–10 opens at the end of the tape, whereupon tape switch relay 120 restores and opens contacts 123 to stop the out-message motor B–1 and restore the out-message monitor relay 310.

The machine is now at normal and conditioned for furture operations.

*Special operations of the tape transport mechanism*

Figure 6:
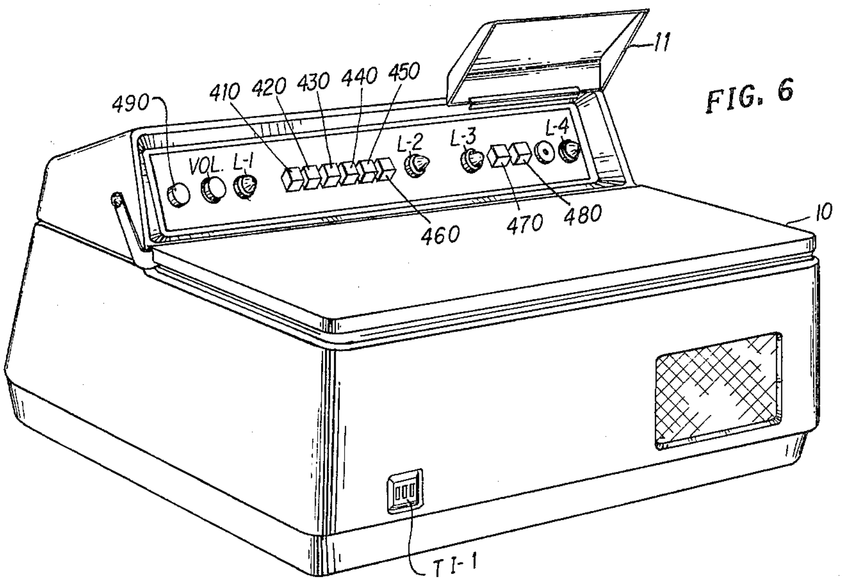
FIG. 6 is a left-front view of the machine showing the push button arrangement and showing the dictate cover raised.
Figure 7:
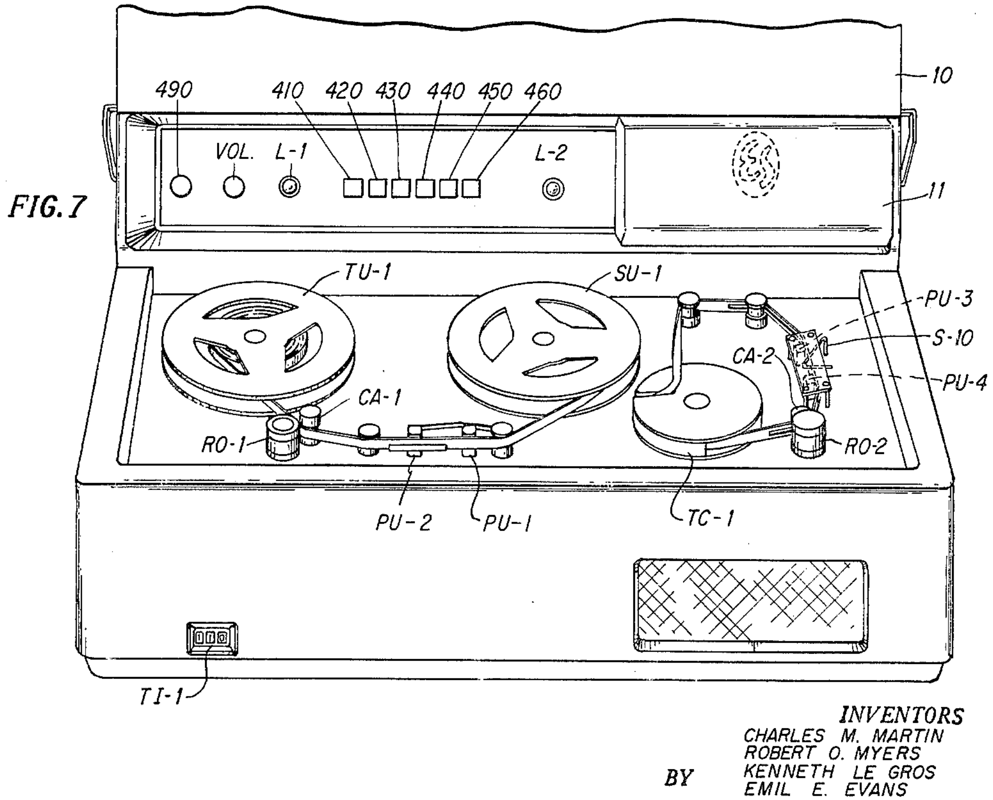
FIG. 7 is a front view of the machine with the tape deck access cover raised showing the respective locations of the take-up reel, supply reel, outgoing message tape cartridge, capstans, pressure rollers and pick-up heads.

During each of the following sub-titled operational descriptions, reference will be had with FIGS. 1 through 4 inclusive, and FIGS. 6 and 7 of the drawings.

*Rewind.*—It is assumed for this particular type of operational description of the tape transport mechanism, that the local subscriber S has been away from his telephone for a considerable length of time and that the machine has answered and recorded several incoming messages received over the central office line. Therefore, when the local subscriber returns to his telephone and desires to hear these messages, it is necessary that the tape containing the message be rewound on the supply reel SU–1 from the take-up reel TU–1 before the machine can be operated to play back the message to the local subscriber.

In order to condition the machine to operate properly for the Rewind operation, it is assumed that the power cord is plugged into the conventional source of alternating current and that the STOP push button 410 may be depressed and locked operated, whereby power is not extended into the machine for the time being.

In order to further condition the machine for the Rewind operation it is assumed that the REWIND push button 440 is depressed and locked, whereby STOP push button 410 is released and the Rewind operation of the machine is initiated.

In actuating its contacts, REWIND push button 440 closes contacts 441 to complete a circuit for operating rewind relay 350 and memory relay 360 in parallel. The circuit for operating relays 350 and 360 may be traced as extending from the fused side of the line through the break contacts of timer switch S–13, conductor 17, contacts 333, conductor 54, contacts 441 of REWIND push button 440, conductor 46, and (1) through the winding of rewind relay 350 to the return side of the line, and (2) through rectifier RE–5, resistance R21, the winding of memory relay 360 and resistance R20 to the return side of the line. It will be pointed out that while the rewind relay 350 operates over an alternating current circuit, the memory relay 360 operates over a direct current circuit, with the alternating current being rectified by means of rectifier RE–5.

In actuating its contacts, rewind relay 350 prepares a point in the operating circuit to rewind motor B–3 at the make contacts of armature 351 and performs no useful function for the time being at the remainder of its contacts.

In actuating its contacts, memory relay 360 closes contacts 361 and the make contacts of armature 362 to complete a circuit for operating rewind motor B–3, opens a point in the circuit to forward motor B–4 at the break contacts of armature 362, prepares a point in the direct current brake circuit to forward motor B–4 at the make contacts of armature 363, performs no useful function for the time being at the break contacts of armature 363 and opens contacts 364 to maintain an incomplete circuit to solenoid SO–1 and play relay 340. The circuit for rewind motor B–3 may be traced as extending from the fused side of the line through the break contacts of armature 331, contacts 361, the make contacts of armature 362, the make contacts of armature 351 and through the winding of rewind motor B–3 to the return side of the line.

Rewind motor B–3 now operates to rewind the tape from the take-up reel TU–1 to the supply reel SU–1, with REWIND push button 440 locked operated until a visual observation of the tape indicator TI–1 indicates zero. At this time, timer switch S–13 is operated in a well-known manner to open its break contacts, whereby the circuit to rewind motor B–3 is opened as hereafter described.

It will be noted that the circuit to rewind relay 350 is opened by timer switch S–13, whereby relay 350 restores to open the circuit to rewind motor B–3, which thereupon starts coasting to a stop. The circuit to memory relay 360 is also opened, but this relay remains operated as hereafter described. It is pointed out that the rectified current through the rectifier RE–5 for energizing memory relay 360 also charged condenser C13, whereby at the time that the circuit is opened to rewind relay 350 and to memory relay 360, condenser C13 will discharge through memory relay 360 to maintain this relay operated for a period of time such as approximately 2 seconds. During the time that memory relay 360 is maintained operated after rewind relay 350 has restored, a direct current brake circuit to forward motor B–4 is completed. This brake circuit may be traced as extending the alternating current from the fused side of the line through the break contacts of armature 331, contacts 361, make contacts of armature 362, break contacts of armature 351, rectifier RE–6 where the alternating current is rectified into direct current, make contacts of armature 363, contacts 352, through forward motor B–4, and break contacts of armature 342 to the return side of the line. Forward motor B–4 is therefore energized by this direct current over the above traced path to apply the magnetic braking action to the mechanis mto bring it to a stop from its Rewind operation. At this stage of the operational description it will be assumed that condenser C13 has completely discharged, whereupon memory relay 360 restores with no further effect upon any of the circuits for the time being.

Also, at this stage of the operational description it will be noted that all of the tape with the previously recorded incoming message has been rewound on the take-up reel TU–1 and the machine is conditioned to be operated in its future playback or fast-forward operations.

*Playback.*—It is assumed for this particular type of operational description of the tape transport mechanism, that the machine has automatically answered and recorded a number of incoming messages and that it has thereafter been operated in its "Rewind" operation to rewind the tape from the supply reel SU–1 onto the take-up reel TU–1.

In order to condition the machine to operate properly for the Playback operation, wherein it is desired to listen to the recorded incoming messages, it is assumed that the power cord is plugged into a conventional source of alternating current and that STOP push button 410 may be depressed and locked operated, whereby power is not extended into the machine for the time being.

In order to further condition the machine for the Playback operation, it is assumed that PLAYBACK push button 430 is depressed and locked, whereby STOP push button 410 is released and the Playback operation of the machine is initiated.

In actuating its contacts, PLAYBACK push button 430 closes contacts 431 to complete a circuit for energizing the primary winding of transformer T–1 of the power supply and completes a circuit at contacts 432 for energizing capstan motor B–2, play relay 340 and solenoid SO–1 in parallel. The circuit for energizing the primary winding of transformer T–1 may be traced as extending from the fused side of the line, the break contacts of timer switch S–13, contacts 411 of STOP push button 410, contacts 431 of PLAYBACK push button 430, conductor 16, and through the primary winding of transformer T–1 to the return side of the line. The parallel circuit for energizing capstan motor B–2, play relay 340 and solenoid SO–1 may be traced as extending from the fused side of the line, the break contacts of timer switch S–13, conductor 17, contacts 333, conductor 54, contacts 432 of PLAYBACK push button 430, the break contacts of foot contral switch S–11, conductor 53, and (1) through the winding of capstan motor B–2 to the return side of the line, and (2) converted to direct current through rectifier RE–7, contacts 364, and through the respective windings of play relay 340 and solenoid SO–1 to the return side of the line. Solenoid SO–1 energizes to move pressure roller RO–1 into engagement with both the tape and capstan CA–1, which in turn is rotated by the capstan motor B–2, whereby the tape is pulled in the desired direction.

In actuating its contacts, play relay 340 closes contacts 341 and the make contacts of armature 342 to energize forward motor B–4 and rewind motor B–3 in series, while the opening of the break contacts of armature 342 disconnects forward motor B–4 from the return side of the line and the opening of contacts 343 prevents the effect of any alternating current voltage feedback to condenser C–14.

At this stage of the operational description it will be noted that capstan motor B–2 pulls the incoming message tape across pick-up head PU–2, where the message is transmitted thereby to playback amplifier 302 over a circuit extending from pick-up head PU–2 through contacts 423 of AUTOMATIC push button 420 and over conductor 51 to playback amplifier 302. This signal is amplified by means of playback amplifier 302 and extended out over conductor 38 to the right-hand winding of transformer T–7 with the signal being induced into the left-hand winding and extended to transistor amplifier TR–1, where it is further amplified and applied to the right-hand winding of transformer T–6. The signal is induced into the left-hand winding of transformer T–6 and audibly reproduced by loudspeaker LS–1.

It will be appreciated that the energizing of forward motor B–4 and rewind motor B–3 in series represents a low torque circuit to provide a constant back pressure of the tape on the pick-up head PU–2 and to provide proper tension on the tape.

When the particular message has been played back, PLAYBACK push button 430 may be restored in response to the operation of the STOP push button 410, whereby the circuit is opened to capstan motor B–2 to allow it to coast to a stop and the previously described circuit in the application of power to the primary winding of transformer T–1 of the power supply is also opened. It will be noted however that during the time that PLAYBACK push button 430 was locked operated, condenser C15 was charged in the aforedescribed manner through the break contacts of armature 353. Therefore, when PLAYBACK push button 430 was released, condenser C15 discharged over an obvious circuit to maintain play relay 340 and solenoid SO–1 energized for a time period of approximately 2 seconds. During the time that the capstan motor B–2 is coasting to a stop, play relay 340 maintains the previously traced series circuits for operating forward motor B–4 and rewind motor B–3, whereby these two motors will eliminate any slack on the tape loop that would normally be caused by the coasting action of capstan motor B–2. In this manner, excessive tape travel is eliminated during the time that the capstan motor B–2 is stopping. After the lapse of a predetermined time, condenser C15 has completely discharged to allow play relay 340 and solenoid SO–1 to restore. Solenoid SO–1 will therefore apply no pressure against the tape and capstan CA–1 by means of its roller RO–1, and further movement of the tape by the capstan motor B–2 is prevented while the releasing of play relay 340 opens the previously traced circuits to stop forward motor B–4 and rewind motor B–3.

It will be noted that the machine has been operated to select and play back a particular message that has been recorded on the incoming message tape and it may be further operated merely by again operating the PLAYBACK push button 430 or the machine may be operated in other or selected subsequent operations.

*Fast Forward.*—It is assumed for this particular type of operational description of the tape transport mechanism, that the machine has first answered and recorded a number of incoming messages and that it has further been operated in its previously described "Rewind" operation, wherein it is desired to quickly bypass the first recorded messages in order to play back one of the last recorded messages. It will be appreciated that for this particular operational description, only the tape transport mechanism portion of the machine will be operated.

In order for the machine to operate properly for the Fast-forward operation, it is assumed that the power cord is plugged into the conventional source of alternating current. It is further noted that since only the tape transport mechanism of the machine will be operated for this particular type of operational description, the circuit for energizing the power supply of the machine is not completed since none of the other apparatus in the machine will be used.

In order to initiate the operation of the tape transport mechanism in the Fast-forward operation, it is assumed that FAST FORWARD push button 460 is depressed and held in this condition.

In actuating its contacts, FAST FORWARD push button 460 closes contacts 461 and opens contacts 462 respectively to prepare points in subsequently described and used brake circuit networks using rewind motor B–3 and closes contacts 463 to complete a circuit for operating fast forward relay 330. This circuit for operating fast forward relay 330 may be traced as extending from the fused side of the line, break contacts of timer switch S–13, contacts 463, conductor 50, the current being rectified through rectifier RE–4, resistance R19, the winding of fast forward relay 330 and through resistance R18 to the return side of the line.

In actuating its contacts, fast forward relay 330 opens the break contacts of armature 331 with no apparent effect on the circuits for the time being, closes the make contacts of armature 331 to prepare a point in the above-mentioned brake circuit, closes contacts 332 to complete a circuit for operating forward motor B–4 and opens contacts 333 to temporarily render the operation of REWIND push button 440 and PLAYBACK push button 430 ineffective for preventing the mechanism from going into the rewind or the playback operation until it has come to a complete stop from the fast forward operation. The circuit for operating forward motor B–4 may be traced as extending from the fused side of the line, through the break contacts of timer switch S–13, contacts 463 of FAST FORWARD push button 460, conductor 50, down through contacts 332, the break contacts of armature 362, through the winding of forward motor B–4 and break contacts of armature 342 to the return side of the line.

Forward motor B–4 will operate at fast speed, since full current is applied to it, thereby winding the tape at a fast speed from the supply reel SU–1 onto the takeup reel TU–1. When it is desired to stop this operation of the tape transport mechanism, FAST FORWARD push button 460 is released, thereby opening the previously described circuit to forward motor B–4 and to the fast forward relay 330. Forward motor B–4 therefore starts coasting to a stop, however, fast forward relay 330 is held operated for a predetermined time of about 2 seconds due to the direct current charge on condenser C12. Condenser C12 will discharge through fast forward relay 330 to hold it operated for this predetermined time. The release of FAST FORWARD push button 460 completes a brake applying circuit at its contacts 462 whereby direct, or rectified, current is applied to rewind motor B–3, which is energized by this direct current to apply a braking action to the mechanism to bring it to a complete stop. This braking circuit may be traced as extending from the fused side of the line, make contacts of armature 331, conductor 49, contacts 462 of FAST FORWARD push button 460, conductor 48, break contacts of armature 351, rectified through rectifier RE–6, break contacts of armature 363, contacts 343 and through the winding of rewind motor B–3 to the return side of the line. Rewind motor B–3 thus applies the braking action to the tape transport mechanism until condenser C12 has completely discharged, at which time fast forward relay 330 restores to open the above-traced braking circuit to rewind motor B–3.

At this stage of the operational description it will be appreciated that the machine can be operated into the "Playback" or the "Rewind" operation, or other operations, all as previously described.

*Erase*.—It is assumed for this particular type of operational description of the tape transport mechanism, that all of the incoming recorded messages have been played back to the local subscriber S and that it is desired to remove these messages from the tape in order that the machine may thereafter use the incoming message tape to record future incoming messages. It is also assumed that since all of the messages have been played back, the tape will be on the take-up reel TU–1 and that in order for the tape to be on the supply reel SU–1 for the future Record operations, it will be necessary to operate the transport mechanism in its "Rewind" operation and to simultaneously erase the previously recorded messages as the tape is being rewound.

In order to condition the machine to operate properly for the simultaneous Rewind and Erase operations, it is assumed that the power cord is plugged into a conventional source of alternating current, whereby the subsequent operation of the machine can effectively take place.

In order to further condition the machine for the simultaneous Rewind and Erase operations, it is assumed that REWIND push button 440 and ERASE push button 450 are simultaneously depressed and locked in this condition to initiate the desired operation of the tape transport mechanism.

It will be appreciated that the tape transport mechanism operates in the same manner as described in the previous section entitled "Rewind" in response to the depressing of the REWIND push button 440 and it is therefore believed unnecessary to repeat the operation in this particular section.

In actuating its contacts, ERASE push button 450 closes contacts 451 to complete a circuit for energizing the primary winding of the power transformer T–1 and closes contacts 452 to extend the −12 volt potential to oscillators 303 and 401. It will be pointed out that oscillator 401 is ineffective during the present operational description. The circuit for energizing the primary winding of transformer T–1 may be traced as extending from the fused side of the line, the break contacts of timer switch S–13, contacts 411 of STOP push button 410, contacts 451 of ERASE push button 450, conductor 16, and through the primary winding of transformer T–1 to the return side of the line. The circuit for extending the −12 volt pontential to oscillator 303 may be traced as extending from the output of the power supply over conductor 15, contacts 452 of ERASE push button 450, conductor 47, and to oscillator 303.

The tape transport mechanism operates responsive to the depressing of the REWIND push button 440 in the same manner as described in the previous section entitled "Rewind" wherein the tape is transferred from the take-up reel TU–1 to the supply reel SU–1 in the manner such as described. However, during the time that the tape is being rewound onto the supply reel SU–1, the output from oscillator 303 is induced into the left-hand winding of transformer T–7, with a portion of this output extended from the lower lefthand section thereof over a circuit including conductor 31, the make contacts of armature 255, conductor 30 and to the incoming message erase pick-up head PU–1. During the rewind operation, the tape is pulled across the incoming erase pick-up head PU–1, whereby the above-mentioned portion of the signal from the oscillator 303 is effective for causing pick-up head PU–1 to erase the message that is presently on the tape. Therefore, during the time that the tape is being rewound onto supply reel SU–1 by the present rewind operation, the recorded message thereon is being simultaneously erased. At the time that all of the tape has been rewound onto supply reel SU–1 from take-up reel TU–1, REWIND push button 440 and ERASE push button 450 are both restored in response to depressing of any other push button, at which time the tape transport mechanism is restored to noraml and the machine is conditioned for future operations.

*Miscellaneous switches and their operation*

In this section a description of foot control switch S–11, tape end warning switch S–12, timer switch (elapsed time) S–13 and RESET push button 490 will be given.

Although apparatus to provide foot control selection of the Playback and Rewind operations of the machine is not shown, it will be appreciated that any suitable foot operated plug-in type of apparatus can be conveniently connected thereto, with it being noted that the break contacts of foot control switch S–11 would be opened in response to said connection to transfer control of the machine to the foot operated apparatus.

FIGS. 6 and 7 of the drawings disclose a tape indicator TI–1, which is set at zero when all the incoming message tape is on the supply reel SU–1. It will be appreciated that for the lower limit of tape travel, the full amount of tape will be wound on the supply reel SU–1 and when the tape is at its upper limit of travel, the full amount of tape will be wound on the take-up reel TU–1. Although not shown, the tape indicator TI–1 is driven by any suitable means such as a cable or flexible shaft from forward motor B–4, with an arrangement controlled by the tape indicator TI–1 in any suitable manner for operating timer switch S–13 and tape end switch S–12. Timer switch S–13 will operate if an attempt is made to overdrive the tape transport mechanism in either its upper or lower limits of tape travel. Therefore, when the timer switch S–13 is operated, the current supply circuit is opened by means of its break contacts to stop the operation of the mechanism and its make contacts transfers control of the current supply to RESET push button 490. RESET push button 490 may be used particularly in combination with certain of the other push buttons to operate the mechanism away from either of the limits and to set the tape indicator TI–1 at zero.

The tape end switch S–12 is operated as mentioned above to close its contacts at a predetermined time prior to the tape reaching the upper limit of travel, to complete a circuit from oscillator 401 for the extension of a high frequency tone to the calling line as an indication, or warning, thereto, that there is only a short supply of tape left for recording the present incoming message.

Having described our invention and what is condsidered new and desired to have protected by Letters Patent will be pointed out in the appended claims.

What is claimed is:

1. In a device for automatically answering and recording messages on calls extended to an unattended telephone station; a telephone line connected in multiple to said device and to said unattended station; a calling station having access to said line; a first recording medium having an outgoing message followed by a special signal recorded thereon; an out-message motor for driving said first medium; a ringing current source; means for applying said ringing current source to said telephone line in response to the extension of a call from said calling station to said device; means including out-message reproducing means operated in response to receipt of said ringing current for energizing said out-message motor to drive said first medium and reproduce both said recorded outgoing message and said special signal for transmission over said telephone line to said calling station to inform said calling station by means of said outgoing message to commence an incoming message subsequent to the termination of said special signal; means in said device connected in multiple to said out-message reproduding means for amplifying and rectifying only said special signal; a second recording medium; an in-message motor for driving said second medium; in-message recording means; a normally open energizing circuit to said in-message motor; special signal responding means operated in response to receipt of only said rectified special signal for a predetermined period of time; control means operated in response to said operation of said special signal responding means; means operated by said control means for maintaining itself operated, for disconnecting said out-message reproducing means from said telephone line, for connecting said in-message recording means thereto and for completing said circuit to energize said in-message motor; said second medium thereafter driven by said in-message motor to record an incoming message from said calling station thereon; a forward motor and a rewind motor, each arranged to provide specific driving control of said second recording medium; a play relay connected in multiple to said energizing circuit of said in-message motor and operated simultaneously therewith in response to the completion of said energizing circuit; a normally incomplete series circuit to said forward and said rewind motors; and means operated in response to said operation of said play relay for completing said series circuit to energize said forward and said rewind motors, whereby said energized motors exert a constant takeup and back pressure on said second recording medium during the time said second medium is driven by said in-message motor.

2. In a device for automatically answering and recording messages on calls extended to an unattended telephone station such as claimed in claim 1; including means in said device operated in response to the termination of said incoming message for restoring said control means to normal to open said energizing circuit to said in-message motor and said play relay; and means for maintaining said play relay operated for a predetermined time thereafter to maintain said forward and said rewind motors energized during said predetermined time; said forward and said rewind motors thereby controlling movement of said second recording medium to eliminate overrun thereof during the time that said in-message motor is stopping.

3. In a device for automatically answering and recording messages on calls extended to an unattended telephone station such as claimed in claim 2; including a normally open rewind energizing circuit to said rewind motor; rewind initiating means manually operated after the expiration of said predetermined time and said forward and said rewind motors have ceased operation for completing said rewind circuit to energize only said rewind motor to drive said second recording medium back to the start location of said recorded incoming message; said rewind initiating means thereafter manually restored to open said rewind energizing circuit to said rewind motor; a normally open braking circuit to said forward motor; and means operated in response to said manual restoration of said rewind initiating means for completing said braking circuit to reenergize said forward motor to control subsequent rewind movement of said second medium by gradually bringing said movement to a stop.

4. In a device for automatically answering and recording messages on calls extended to an unattended telephone station such as claimed in claim 3; including a forward relay; a normally open circuit to said forward relay; forward initiating means manually operated for completing said circuit to energize said forward relay; a normally open first forward energizing circuit to said forward motor; means operated in response to said operation of said forward relay for completing said fast forward circuit to reenergize said forward motor and drive said second medium forward to a particular desired section of said recorded incoming message; a normally open braking circuit to said rewind motor; means operated in response to said operation of said forward relay for conditioning said normally open braking circuit to said rewind motor; and means operated in response to the restoration of said forward initiating means for completing said braking circuit to reenergize said rewind motor to control subsequent forward movement of said second recording medium by gradually bring said movement to a stop.

5. In a device for automatically answering and recording messages on calls extended to an unattended telephone station such as claimed in claim 4; including means for maintaining said forward relay energized for a predetermined time after said forward initiating means is manually restored, thereby maintaining said rewind motor energized for said predetermined time to eliminate overrun of said forward movement of said second medium during the time said forward motor is stopping.

(References on following page)

References Cited by the Examiner

UNITED STATES PATENTS

| | | | |
|---|---|---|---|
| 2,542,192 | 2/1951 | Handschin | 179—6 |
| 2,553,410 | 5/1951 | Handschin | 179—6 |
| 2,574,218 | 11/1951 | Lynch | 179—100.2 |
| 2,724,015 | 11/1955 | Van Deventer at al. | 179—6 |
| 2,793,252 | 5/1957 | Augustadt | 179—6 |
| 2,873,318 | 2/1959 | Moore | 179—100.2 |
| 2,881,253 | 4/1959 | Marheine | 179—6 |
| 2,909,337 | 10/1959 | Lahti et al. | 242—55.12 |
| 2,928,898 | 3/1960 | Salzberg | 179—6 |
| 2,938,677 | 5/1960 | Flan et al. | 242—55.12 |
| 2,946,852 | 6/1960 | Brown et al. | 179—6 |

FOREIGN PATENTS 853,024 11/1960 Great Britain.

OTHER REFERENCES

RCA Tech. Note, No. 261, 2 pages, June 1959.

IRVING L. SRAGOW, *Primary Examiner.*

L. MILLER ANDRUS, BERNARD KONICK, *Examiners.*

P. C. FLATTERY, J. P. SCHERLACHER, G. LIEBERSTEIN, *Assistant Examiners.*